US011899677B2

United States Patent

Hoxie et al.

(12) United States Patent
(10) Patent No.: US 11,899,677 B2
(45) Date of Patent: Feb. 13, 2024

(54) SYSTEMS AND METHODS FOR AUTOMATICALLY CURATING QUERY RESPONSES

(71) Applicant: Elasticsearch B.V., Mountain View, CA (US)

(72) Inventors: Quinlan J. Hoxie, San Francisco, CA (US); Matthew T. Riley, San Francisco, CA (US)

(73) Assignee: Elasticsearch B.V., Amsterdam (NL)

( * ) Notice: Subject to any disclaimer, the term of this patent is extended or adjusted under 35 U.S.C. 154(b) by 0 days.

(21) Appl. No.: 17/241,424

(22) Filed: Apr. 27, 2021

(65) Prior Publication Data

US 2022/0342880 A1 Oct. 27, 2022

(51) Int. Cl.
*G06F 16/2458* (2019.01)
*G06F 16/248* (2019.01)

(52) U.S. Cl.
CPC ........ *G06F 16/2462* (2019.01); *G06F 16/248* (2019.01)

(58) Field of Classification Search
None
See application file for complete search history.

(56) References Cited

U.S. PATENT DOCUMENTS 6,421,675 B1 7/2002 Ryan et al.
6,957,261 B2 10/2005 Lortz
7,599,938 B1 10/2009 Harrison, Jr.
7,698,261 B1 4/2010 Khoshnevisan
7,783,630 B1 8/2010 Chevalier et al.
7,873,641 B2 1/2011 Frieden
7,945,571 B2 5/2011 Wanker
7,958,127 B2 6/2011 Edmonds et al.
8,131,716 B2 3/2012 Chevalier et al.
8,312,009 B1 11/2012 Bostock
8,386,482 B2 2/2013 Gopalakrishnan
8,412,702 B2 4/2013 Cozzi
8,527,344 B2 9/2013 Rosenthal
8,577,856 B2 11/2013 Mizrahi
8,620,891 B1 12/2013 Thirumalai
8,744,978 B2 6/2014 Zhuang et al.
8,874,586 B1 10/2014 Sommers et al.
8,892,552 B1 11/2014 Hansson et al.
(Continued)

FOREIGN PATENT DOCUMENTS

WO 2015154679 A1 10/2015

OTHER PUBLICATIONS

Hongjie, Training method and device of ranking model, Feb. 21, 2021 (Year: 2021).*
(Continued)

*Primary Examiner* — Dawaune A Conyers
(74) *Attorney, Agent, or Firm* — Quinn IP Law

(57) ABSTRACT

Systems and methods that are adapted for automatic curation of query responses are disclosed herein. An example method includes obtaining user action metrics corresponding to responses provided in reply to a query for a target resource, the query having a search term, determining a portion of the responses having user action metrics with statistical significance, generating a list of curated responses based on the portion of the responses, and providing the curated responses in reply queries having the search term.

15 Claims, 5 Drawing Sheets

(56) References Cited

U.S. PATENT DOCUMENTS

| | | | |
|---|---|---|---|
| 8,943,401 B2 | 1/2015 | Martinez et al. | |
| 8,959,073 B2 | 2/2015 | Riley et al. | |
| 9,189,552 B2 | 11/2015 | Riley et al. | |
| 9,619,528 B2 | 4/2017 | Riley et al. | |
| 9,959,352 B2 | 5/2018 | Riley et al. | |
| 9,959,356 B2 | 5/2018 | Riley et al. | |
| 10,013,493 B1 | 7/2018 | Gandhi | |
| 10,467,309 B2 | 11/2019 | Riley et al. | |
| 10,579,693 B2 | 3/2020 | Riley et al. | |
| 2004/0068486 A1 | 4/2004 | Chidlovskii | |
| 2004/0078224 A1 | 4/2004 | Schramm-Apple et al. | |
| 2004/0093321 A1 | 5/2004 | Roustant et al. | |
| 2006/0064411 A1 | 3/2006 | Gross et al. | |
| 2007/0067297 A1 | 3/2007 | Kublickis | |
| 2007/0112781 A1 | 5/2007 | McMullen et al. | |
| 2007/0175674 A1 | 8/2007 | Brinson et al. | |
| 2007/0185826 A1 | 8/2007 | Brice et al. | |
| 2008/0016098 A1 | 1/2008 | Frieden et al. | |
| 2008/0082904 A1 | 4/2008 | Martinez et al. | |
| 2008/0201348 A1 | 4/2008 | Edmonds et al. | |
| 2008/0222140 A1 | 9/2008 | Lagad et al. | |
| 2008/0288446 A1 | 11/2008 | Hu et al. | |
| 2009/0100051 A1 | 4/2009 | Bhatt et al. | |
| 2009/0106202 A1 | 4/2009 | Mizrahi | |
| 2009/0138458 A1 | 5/2009 | Wanker | |
| 2009/0164929 A1 | 6/2009 | Chen et al. | |
| 2009/0171813 A1 | 7/2009 | Byrne et al. | |
| 2009/0234834 A1 | 9/2009 | Cozzi | |
| 2009/0254529 A1 | 10/2009 | Goldentouch | |
| 2010/0274783 A1 | 10/2010 | Chevalier et al. | |
| 2011/0016104 A1 | 1/2011 | Leconte | |
| 2011/0022549 A1 | 1/2011 | Zhuang et al. | |
| 2011/0055186 A1 | 3/2011 | Gopalakrishnan | |
| 2011/0087647 A1 | 4/2011 | Signorini et al. | |
| 2011/0087967 A1 | 4/2011 | Ganz et al. | |
| 2012/0054176 A1 | 3/2012 | Chung et al. | |
| 2012/0123858 A1 | 5/2012 | Rosenthal | |
| 2012/0130976 A1 | 5/2012 | Cone et al. | |
| 2013/0097156 A1 | 4/2013 | Nagaralu et al. | |
| 2013/0110824 A1 | 5/2013 | DeRose et al. | |
| 2013/0159222 A1* | 6/2013 | Blanco | G06F 16/338 707/E17.014 |
| 2013/0173368 A1 | 7/2013 | Boutin et al. | |
| 2013/0254294 A1 | 9/2013 | Isaksson | |
| 2013/0262436 A1 | 10/2013 | Barsness et al. | |
| 2013/0282686 A1 | 10/2013 | Amin | |
| 2014/0059029 A1 | 2/2014 | Magill et al. | |
| 2014/0129534 A1 | 5/2014 | Riley et al. | |
| 2014/0129535 A1 | 5/2014 | Riley et al. | |
| 2014/0129540 A1 | 5/2014 | Riley et al. | |
| 2014/0250145 A1* | 9/2014 | Jones | G06F 16/3329 707/769 |
| 2015/0066894 A1 | 3/2015 | Riley et al. | |
| 2015/0379148 A1 | 12/2015 | Riley et al. | |
| 2016/0026720 A1* | 1/2016 | Lehrer | G06Q 10/103 707/710 |
| 2018/0101581 A1 | 4/2018 | Toumura et al. | |
| 2018/0107697 A1 | 4/2018 | Tariq et al. | |
| 2018/0246977 A1 | 8/2018 | Riley et al. | |
| 2018/0260487 A1 | 9/2018 | Riley et al. | |
| 2019/0286676 A1* | 9/2019 | Fatzinger | G06F 40/56 |
| 2019/0303352 A1 | 10/2019 | Levine et al. | |
| 2019/0384798 A1 | 12/2019 | Riley et al. | |
| 2021/0248136 A1* | 8/2021 | Panuganty | G06F 16/2453 |

OTHER PUBLICATIONS

"Extended European Search Report", European Patent Application No. 21171288.0, dated Oct. 15, 2021, 8 pages.

"Google Enterprise Search"; Obtained from Internet: <http://www.google.com/enterprise/search/prodcuts_gss_features.html>; retrieval date: Oct. 10, 2012; 3 pages.

"Google Search Appliance"; Obtained from Internet: <http://developers.google.com/search-appliance/documentation/50/help_gsa/serve_keymatch>; retrieval date: Oct. 10, 2012; 4 pages.

Sexton, Patric, "How to put Google custom site search into your current website design", posted May 8, 2007, internet retrieval Oct. 28, 2013, <http://moz.com/ugc/how-to-put-google-custom-site-search-into-your-current-website-design>, 21 pages.

Biundo, John et al. "Creating Advanced Custom Search Engines" Nov. 15, 2016; internet retrieval May 14, 2014 <http://blogoscoped.com/archive/2006-11-15-n50.html>, 9 pages.

"Custom Search Help," by Google. (Screenshots from Oct. 21-Nov. 30, 2011) Internet Archive source: <http://web.archive.org/web/20111130104016/http://support.google.com/customsearch/> Original URL: <http://support.google.com/customsearch/>, 6 pages.

"Office Action", British Patent Application No. GB2106138.7, dated Sep. 17, 2021, 7 pages.

* cited by examiner national-parks-demo
SAMPLE ENGINE
Overview
Analytics
Query Tester
Reference UI
MANAGE
Documents
Schema
API Logs
SEARCH SETTINGS
Synonyms
Curations
Relevance Tuning
Result Settings
ACCESS
Credentials

200

Query Tester

Create new Curation

Curated Results

| Queries | Last Updated | |
|---|---|---|
| mountains, hills 202 | March 23, 2021 at 04:18PM | Update Remove |
| hiking 204 | March 15, 2021 at 09:25PM | Update Remove |

← Previous 1 Next →

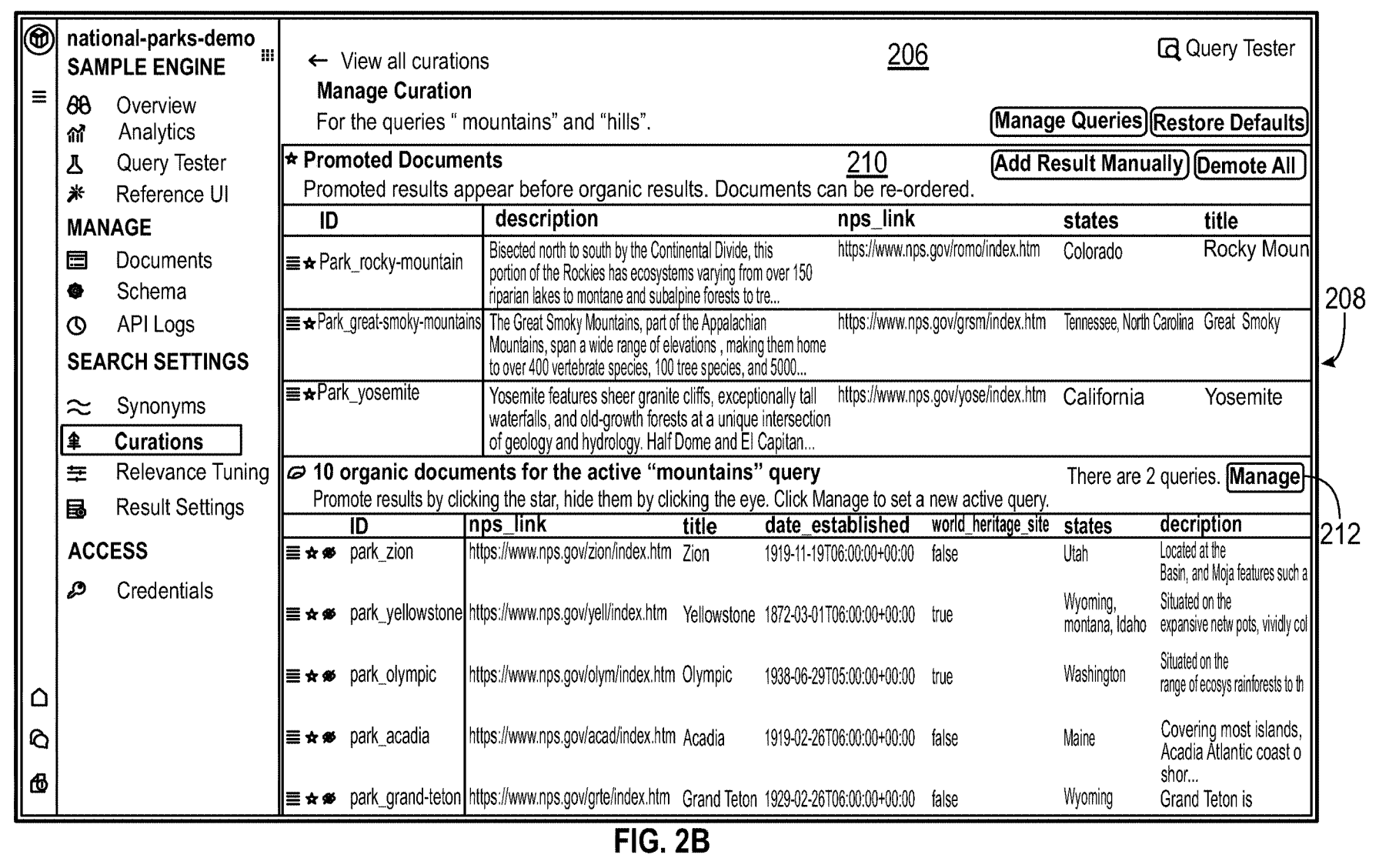

FIG. 2A national-parks-demo
SAMPLE ENGINE
Overview
Analytics
Query Tester
Reference UI
MANAGE
Documents
Schema
API Logs
SEARCH SETTINGS
Synonyms
Curations
Relevance Tuning
Result Settings
ACCESS
Credentials ← View all curations
206
Query Tester
Manage Curation
For the queries " mountains" and "hills".
Manage Queries
Restore Defaults Promoted Documents
210
Add Result Manually
Demote All
Promoted results appear before organic results. Documents can be re-ordered.

| ID | description | nps_link | states | title |
|---|---|---|---|---|
| Park_rocky-mountain | Bisected north to south by the Continental Divide, this portion of the Rockies has ecosystems varying from over 150 riparian lakes to montane and subalpine forests to tre... | https://www.nps.gov/romo/index.htm | Colorado | Rocky Moun |
| Park_great-smoky-mountains | The Great Smoky Mountains, part of the Appalachian Mountains, span a wide range of elevations , making them home to over 400 vertebrate species, 100 tree species, and 5000... | https://www.nps.gov/grsm/index.htm | Tennessee, North Carolina | Great Smoky |
| Park_yosemite | Yosemite features sheer granite cliffs, exceptionally tall waterfalls, and old-growth forests at a unique intersection of geology and hydrology. Half Dome and El Capitan... | https://www.nps.gov/yose/index.htm | California | Yosemite |

208

10 organic documents for the active "mountains" query
There are 2 queries. Manage
Promote results by clicking the star, hide them by clicking the eye. Click Manage to set a new active query.
212

| ID | nps_link | title | date_established | world_heritage_site | states | decription |
|---|---|---|---|---|---|---|
| park_zion | https://www.nps.gov/zion/index.htm | Zion | 1919-11-19T06:00:00+00:00 | false | Utah | Located at the Basin, and Moja features such a |
| park_yellowstone | https://www.nps.gov/yell/index.htm | Yellowstone | 1872-03-01T06:00:00+00:00 | true | Wyoming, montana, Idaho | Situated on the expansive netw pots, vividly col |
| park_olympic | https://www.nps.gov/olym/index.htm | Olympic | 1938-06-29T05:00:00+00:00 | true | Washington | Situated on the range of ecosys rainforests to th |
| park_acadia | https://www.nps.gov/acad/index.htm | Acadia | 1919-02-26T06:00:00+00:00 | false | Maine | Covering most islands, Acadia Atlantic coast o shor... |
| park_grand-teton | https://www.nps.gov/grte/index.htm | Grand Teton | 1929-02-26T06:00:00+00:00 | false | Wyoming | Grand Teton is |

FIG. 2B

SYSTEMS AND METHODS FOR AUTOMATICALLY CURATING QUERY RESPONSES

CROSS-REFERENCE(S) TO RELATED APPLICATION(S)

N/A.

FIELD OF DISCLOSURE

The present disclosure pertains to systems and methods that are adapted for the automatic curation of query responses.

SUMMARY

In one embodiment, the present disclosure is directed to a method comprising obtaining user action metrics corresponding to model responses provided in reply to a query for a target resource, the model responses being provided based on a relevance model; determining one or more of the user action metrics having statistical significance; placing one or more of the responses to the query into a curated list based on their statistical significance, and applying curations to the one or more of the model responses to create curated responses.

In one embodiment, the present disclosure is directed to a method comprising: determining user action metrics over a period of time, the user action metrics pertaining to user actions with respect to model responses generated by a relevance model; determining queries having a ranking above a threshold value; flagging the queries as automatable, and displaying a list of the flagged queries along with controls for adjusting curations of the model responses for the flagged queries.

In one embodiment, the present disclosure is directed to a system comprising: a processor; and a memory for storing executable instructions, the processor executing the instructions to: obtain user action metrics corresponding to model responses provided in reply to a query, the model responses being provided based on a relevance model; determine one or more of the user action metrics having statistical significance; place one or more of the responses to the query into a curated list based on their statistical significance; apply curations to the one or more of the model responses to create curated responses; and provide the curated responses for the query rather than the model responses.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 2A is a screenshot of an example curation user interface with automated curations.

FIG. 2B is a screenshot of an example curation user interface having responses to one of the automated curations.

DETAILED DESCRIPTION

Overview

The present disclosure pertains to systems and methods for curating responses provided by a search engine to queries. A search engine of the present disclosure can utilize a relevance model to provide model responses to queries based on the use of artificial intelligence and/or machine learning. User actions relative to the model responses can be tracked and evaluated for statistical significance in order to generate user action metrics. General categories of user actions can include clicks, views, and so forth with respect to content on a target resource such as a mobile or desktop application, an e-commerce store, and/or publishing website—just to name a few.

It will be understood that user actions and their respective metrics can be a moving target and some relevance models may not appreciate changes in user actions with regard to responses that are being generated. That is, user actions may indicate or infer relevant information about user preferences of the model responses being provided that the relevance model may not be tuned to identify. While relevance models can be adaptive, they are nevertheless limited in their ability to identify anomalies or trends with respect to how users are reacting to the model responses.

These issues proliferate as the numbers of queries and responses grow over time. That is, it becomes cumbersome, if not impossible, for human reviewers to review the model responses and user actions (and metrics) when the velocity and/or volume of the data is significant.

Example Embodiments

Figure 1:
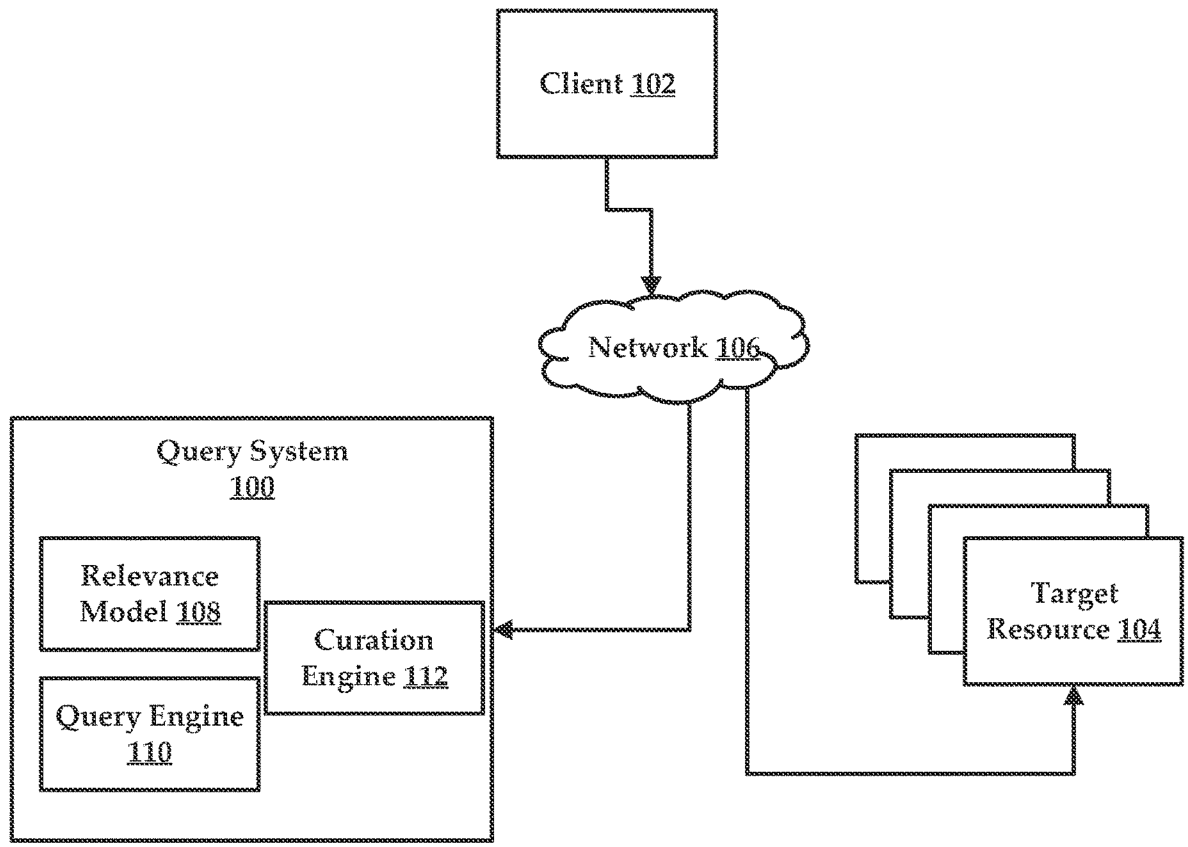
FIG. 1 is a schematic diagram of an example architecture where systems and methods of the present disclosure can be implemented.

FIG. 1 is a schematic diagram of an example architecture where systems and methods of the present disclosure can be implemented. The architecture can comprise a query system 100, a client 102, a target resource 104, and a network 106. Some or all of these components in the architecture can communicate with one another using the network 106. The network 106 can include combinations of networks that enable the components in the architecture to communicate with one another. The network 106 may include any one or a combination of multiple different types of networks, such as cellular, cable, the Internet, wireless networks, and other private and/or public networks. In some instances, the network 106 may include Wi-Fi or Wi-Fi direct.

The client 102 can include any end-user device that a user can utilize to submit queries to the query system 100 and receive responses thereto. The client 102 could include, for example, a server, a desktop computer, a laptop, a smart device, and/or any other similar physical and/or virtual computing device that would be known to one of ordinary skill in the art.

The target resource 104 can comprise any digital information source over which a query can be executed. As illustrated, many target resources may exist and be searched over. The target resource 104 can comprise a mobile application, e-commerce store, publishing website, or another similar resource. Each target resource comprises one or more types of content, such as textual content and/or metadata, which can be identified based on query terms.

Figure 5:
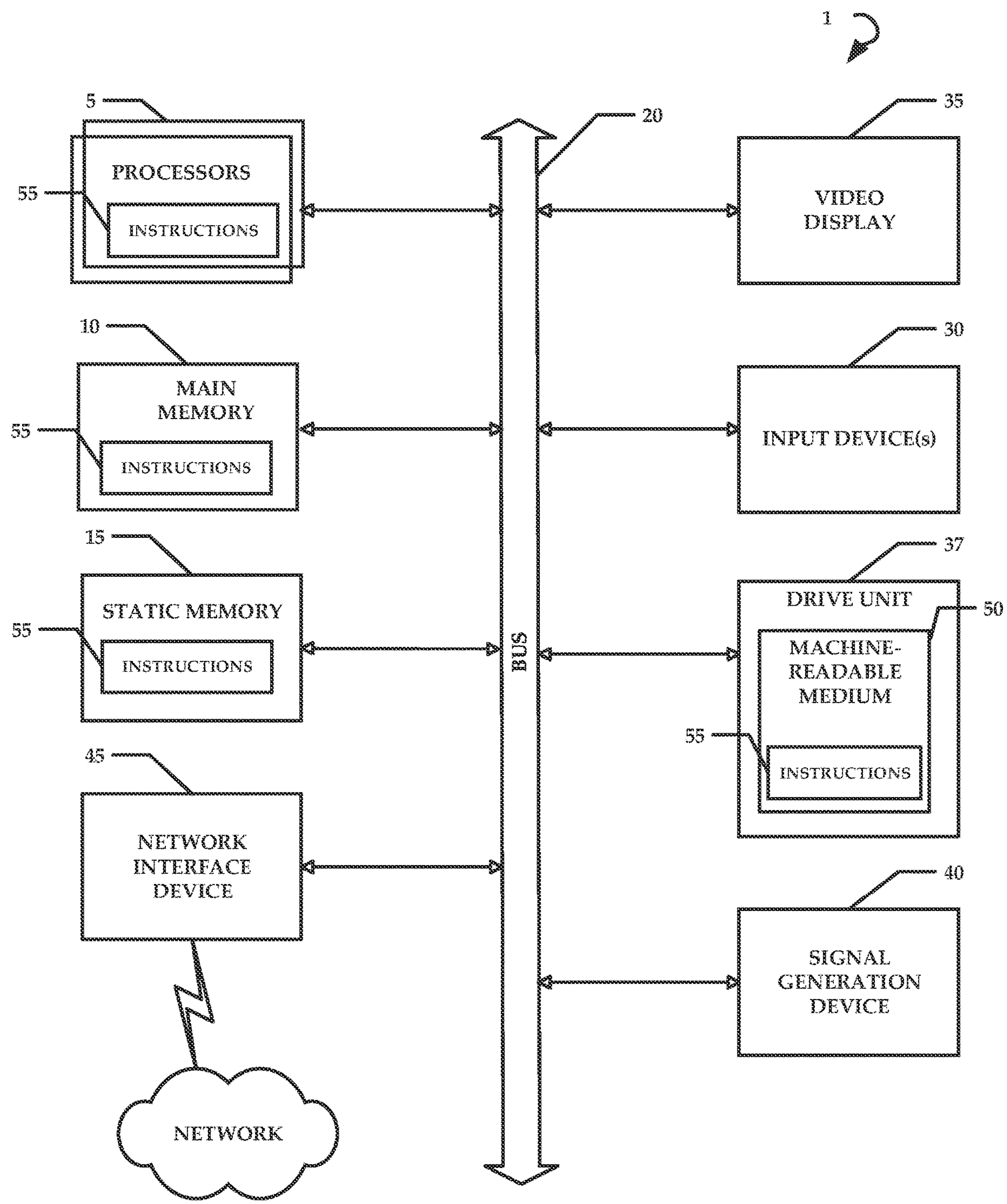
FIG. 5 is a schematic diagram of an example computerized system of the present disclosure.

The query system 100 can comprise a specifically configured computing resource, such as the computer system disclosed with respect to FIG. 5. That is, the query system 100 can comprise a processor and memory. The processor executes instructions stored in memory to provide various functions disclosed herein. Thus, the query system 100 is a particularly programmed computing system that is adapted to provide the practical applications disclosed herein.

The query system 100 implement a relevance model 108, a query engine 110, and a curation engine 112. Each of the components of the query system 100 can be implemented as a stand-alone computing resource, or in a distributed computing model such as a cloud. The components of the query system 100 can also be implemented as an application-specific integrated circuit (ASIC) or an equivalent structure.

The relevance model 108 can be used to automatically generate model responses to a query executed by the query engine 110. For example, a query that is executed against the target resource 104 by the query engine 110 may produce results that can be presented to users. These results that are generated using the relevance model 108 are referred to as model results. User action can be taken by the user of the client 102 with respect to the model results. For example, users can click on links of model results, or other content of the target resource 104 such as videos, audio, forms, and so forth.

For context, this process may include providing model results for a plurality of target resources. For example, if the query terms include "mountains", the model results may include links and/or summaries of various websites that incorporate content pertaining to mountains. User actions with respect to these target resources can be evaluated and metrics can be generated. For example, the query system 100 can determine a volume or aggregate number of clicks or other user actions with respect to each of the model results. The data gathered using this process is generally referred to as user action metrics.

The user action metrics can be fed back into the relevance model 108 to improve the logic of the relevance model 108, with the goal being that the relevance model 108 may produce more relevant model results over time. That is, the model results provided may more closely correspond to user preferences as the user action metrics are analyzed. In sum, the curation engine of the query system 100 can obtain user action metrics corresponding to model responses provided in reply to a query for a target resource. In some embodiments, the model responses are provided based on a relevance model. To be sure, the aspects of the present disclosure need not be used solely in systems that utilize relevance models, but other systems configured to rank query responses automatically or manually for users.

The curation engine 112 can analyze the user actions to generate user action metrics. The curation engine 112 can determine if or when a portion of the user action metrics have statistical significance. Aspects of statistical significance can vary according to use case and per implementation. However, broadly described, statistical significance can involve the curation engine 112 assessing a volume of user actions, which is an example user action metric. For example, a relevant user action could include a number of clicks each result receives, with the number being the user action metric. Again, other user actions may be relevant such as a product purchase, adding an item to a virtual shopping cart, and so forth. In some instances, when the volume meets or exceeds a threshold it may be determined to be statistically significant.

The user actions and corresponding metrics can be tracked by the query system 100 and the user action metrics analyzed by the query system 100 can cover an N number of past days, weeks, hours, years, and/or other defined period of time. When large volumes of user actions and user action metrics are available for target resources identified by a query, a duration of the lookback period may be allowed to be shorter than a lookback period for target resources that have relatively lower volumes of user actions. That is, statistical significance may be hard to determine when user actions/metrics are sparse. In some embodiments, a defined length for the period of time (e.g., lookback period) may be based on the volume of user actions.

In another example, the user action metric could include evaluating distribution of user actions across elements/objects on various target resources. In these cases, the statistical significance is associated with aggregations of user actions and how they are distributed across a plurality of elements/objects on various target resources. For example, users may be far more interested in purchasing certain products, while some products are left abandoned in shopping carts. The curation engine 112 can evaluate the distribution of user actions across targets and identify that user actions and their underlying responses as important.

In some instances, when the curation engine 112 determines that one or more model responses have user action metrics statistical significance, the curation engine 112 may place the one or more responses into a curated list based on their statistical significance.

FIG. 2A is an example GUI 200 that includes a list of curated queries. In this example, a first curated query 202 includes search terms mountains, hills. A second curated query 204 includes a search term of hiking. These curated queries were automatically identified based on analyzing the results of these queries. This analysis can include determining user actions with respect to the results of the queries and determining that their results have statistical significance. Each of the curated queries can also be augmented with information, such as update times and the like.

FIG. 2B is another example GUI 206 that results from clicking on a curated query or search term. For example, when the query/search term of mountain is selected, GUI 206 is displayed.

The GUI includes a list of organic results 208 (e.g., model results), where organic means the results are produced by the relevance model. The automatic curation engine layers onto that and improves specific result sets by ordering some results specifically at the top (in the promoted section). For a person consuming the results, they would see a single list where the promoted/curated/pinned (these are synonymous) results are at the top, followed by the organic results from the relevance model. The GUI can also include a curated list based on each of the responses having at least one aspect of statistical significance. In some embodiments, the results can be placed in ranked order based on their individual statistical significance. Each of the curated responses can be displayed with a unique identifier, along with a link to the target resource, a title, an establishment date, an indication as to whether the target resource is a heritage site, where the target resource is located, and a description of the content of the target resource.

Once results have been placed into the curated list 210, an administrator can add, review, edit, update, and remove results provided in the curated list 210. The user can manage individual results by clicking the manage button 212. In general, the results appearing in the curated list are referred to as curated results. The administrator can edit the curated results to manage how these curated results are presented to end users by adjusting the parameters of the curations. For example, a user may be allowed to adjust the impact of different factors, such as different user interactions. By way of example, a user click can be 4/10 in importance, whereas a user making a purchase could have a 10/10 importance.

When subsequent queries for the search term mountain are received, the responses provided to the requester would correspond to the curated results in the curated list 210. Again, organic results may appear in the list 208. For those target resources that are determined by the curation engine 112 to have user action metrics that are not statistically significant, the query system 100 can be configured to provide model responses. That is, model responses not having statistical significance can continue to be generated by the relevance model. Thus, a query for "mountains" may have twenty results, with five being determined to be statistically significant. The remaining fifteen results are not statistically significant. When a subsequent query is received for "mountains", the query system 100 provides the five curated results generated by the curation engine 112 and the remaining fifteen as generated by the relevance model 108. To be sure, statistical significance is determined relative to one or more metrics (e.g., user actions) for these results as opposed to something inherent to the results themselves.

Also, when curated results are placed into the curated list 210, the curated results are delivered in response to the query term(s) regardless of content changes that may occur at the target resources. For example, a change in content on a target resource that would have ordinarily resulted in the target resource being ignored, excluded or pushed down (occurring low on a results list) based on the use of the relevance model 108 along, these curated results always appear in their ranked order as established in the curated list 210.

The analysis of user action metrics can also expose gaps or flaws in the logic of the relevance model 108. For example, the curation engine 112 may identify a response that has a high volume of user action metrics but is nevertheless ranked lower than other results due to some gap/flaw in the logic. Also, the curation engine 112 can determine when a response is ranked lower than other results having fewer user action metrics in order to identify emerging trends. Thus, curated responses are provided regardless of whether the underlying content of the curated responses has changed in such a way that the relevance model would have not provided the curated responses in response to the query. Stated otherwise, the curation engine 112 positions the best results automatically and subjects the rest of the results for a particular query to a broader relevance model that provides end-users with the best of both worlds.

In some embodiments, the curation engine 112 can periodically and/or continually reevaluate how curated responses are performing by evaluating user action metrics related thereto. When a curated response is determined to have user action metrics (pertaining to user actions with respect to content related to the curated response) that fall below the established statistical significance threshold, the curated response can be dropped from the curation list. Also, in some embodiments, the curation engine 112 can be configured to evaluate how the curated responses are performing and rearrange an order of the curated list of the curated responses based on the evaluation.

Figures 3, 4:
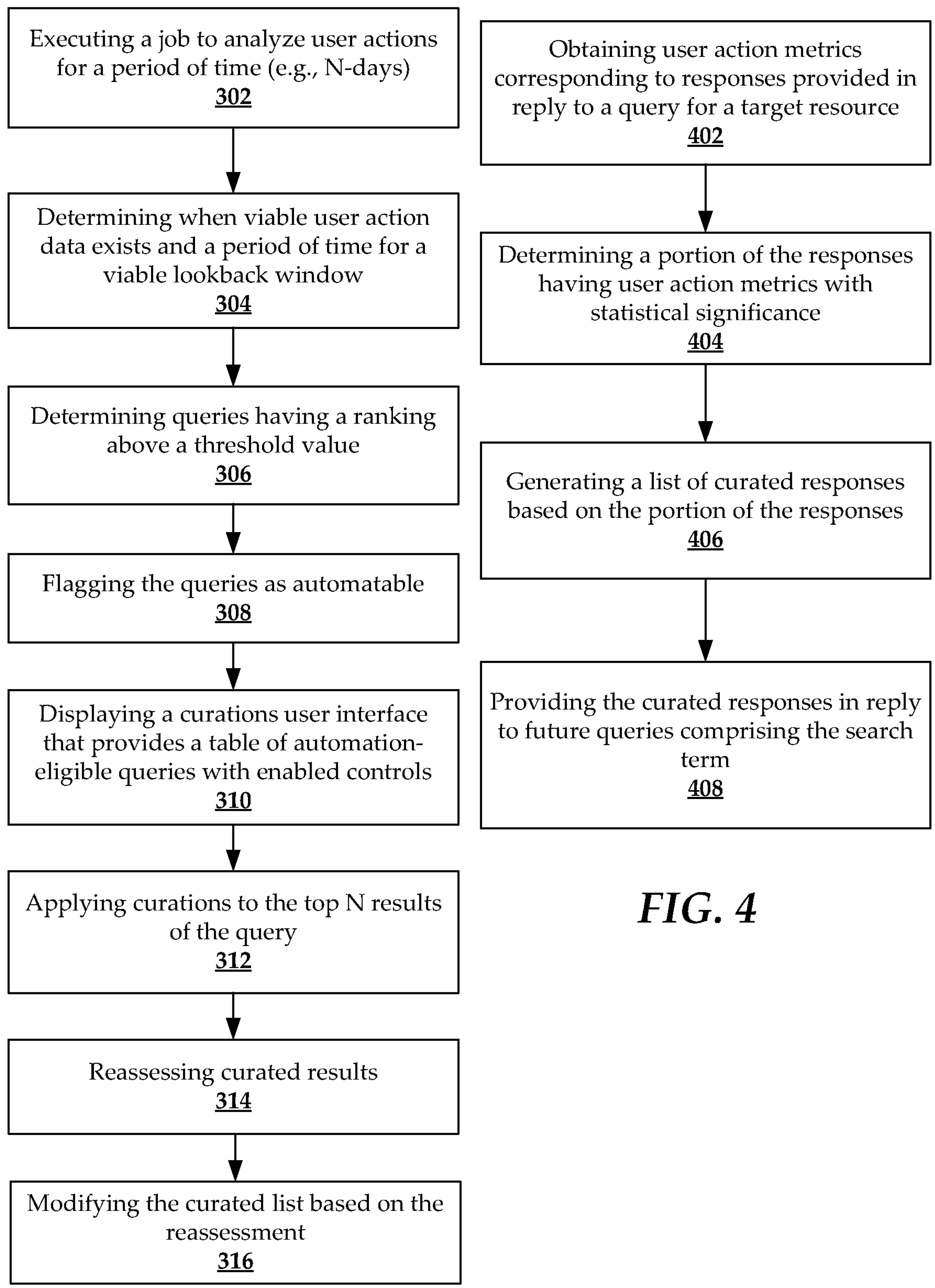
FIG. 3 is a flowchart of an example method of the present disclosure.
FIG. 4 is a flowchart of another example method of the present disclosure.

FIG. 3 is a flowchart of an example method of the present disclosure. The method can comprise a step 302 of executing a job to analyze user actions for a period of time (e.g., N-days). In some embodiments, the user action metrics pertain to user actions with respect to model responses generated by a relevance model.

The method can also include a step 304 of determining when viable user action data exists and a period of time for a viable lookback window. The method can include a step 306 of determining queries having a ranking above a threshold value. In this example, the ranking can include determining which queries produce results that have statistical significance. When one or more queries are statistically significant, the method can include a step 308 of flagging the queries as automatable. These queries and their results can be displayed on a graphical user interface in a list. In some instances, the flagged queries can be displayed along with controls for adjusting curations of the model responses for the flagged queries.

That is, the method can include a step 310 of displaying a curations user interface that provides a table of automation-eligible queries with enabled controls. The controls allow a user to adjust one or more aspects of the curated results.

When a query has been selected for automation, the method can include a step 312 of pinning the top N curated results of the query. For example, the three or five highest number of curated results can be selected (these are merely examples and other numbers can be used). In some embodiments, once the curated results are pinned, manual manipulation by an administrator can be locked to prevent changes to the curated results. In some embodiments, the method includes a step 314 of reassessing curated results, as well as a step 316 of modifying the curated list based on the reassessment.

FIG. 4 is a flowchart of an example method of the present disclosure. The method can include a step 402 of obtaining user action metrics corresponding to responses provided in reply to a query for a target resource. As noted above, the query includes one or more search terms. When a query is executed, responses to that query (based on the search terms) relate target resources (e.g., an application, e-commerce website, etc.). In more detail, the target resources have content that can be actionable. That is, users can interact with that content and these actions can be tracked and analyzed to discover user action metrics. Examples of user action metrics and their measurements are provided supra. For example, statistical significance can be determined by identifying a volume of user actions with respect to the responses and/or a direction of the user actions across the responses.

The method can include a step 404 of determining a portion of the responses having user action metrics with statistical significance. Again, the responses have "user action metrics" inferentially or indirectly due to underlying content having user actions that were analyzed for statistical significance. To be sure, all or a portion of the responses may have user action metrics with statistical significance. Once these statistically significant responses are identified, the method can include a step 406 of generating a list of curated responses based on the portion of the responses. The method can further include a step 408 of providing the curated responses in reply queries comprising the search term. Also, a remainder of the responses not having statistical significance is generated using a relevance model.

As noted above, a portion of the curated responses comprises user-defined curations. For example, a curation user interface can provide a user with controls that allow the user to customize aspects of the curated responses. A user can rearrange the curation list, or selectively adjust aspects or parameters of an individual curated response. For example, the user can adjust a summary of the underlying content of the curated response that is provided to the user when they query for the search term.

The method can include a step of periodically evaluating the curated responses, along with a step of rearranging an order of the curated list of the curated responses based on the evaluation.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions.

The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present disclosure and are intended to represent a broad category of such computer components that are known in the art. Thus, the computer system 1 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer device 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depend on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present technology and its practical application, and to enable others of ordinary skill in the art to understand the invention for various embodiments with various modifications as are suited to the particular use contemplated.

While various embodiments have been described above, they have been presented by way of example only, and not limitation. The descriptions are not intended to limit the scope of the technology to the forms set forth herein. Thus, the breadth and scope of a preferred embodiment should not be limited by any of the above-described exemplary embodiments. The above description is illustrative and not restrictive.

What is claimed is:

1. An automated method of providing curated responses combined with organic search results to a query, comprising:

utilizing a client device to access by a user a search engine via a network, the search engine interfacing with a relevance model executing on a query system, the query system comprising a specially configured computing resource including a curation engine and the relevance model, the relevance model accessing a target resource for providing responses to queries from the client device over the network;

obtaining, at the relevance model from the client device, user action metrics over a period of time, the user action metrics corresponding to responses provided in reply to a query for the target resource, the query having a search term;

determining, by the relevance model, a portion of the responses having user action metrics with statistical significance;

generating, by the curation engine, a list of the curated responses based on the portion of the responses;

providing the curated responses in reply queries comprising the search term; and determining a defined length for the period of time based on a volume of user actions.

2. The method according to claim 1, wherein a portion of the curated responses comprise user-defined curations.

3. The method according to claim 1, wherein the statistical significance is determined by identifying a volume of user actions with respect to the responses or a direction of the user actions across the responses.

4. The method according to claim 1, further comprising:

periodically evaluating the curated responses; and rearranging an order of the list of the curated responses based on the evaluation.

5. The method according to claim 1, wherein the curated responses are provided regardless of whether underlying content of the curated responses have changed in such a way that a relevance model would have not provided the curated responses in response to the query.

6. An automated method of providing curated responses combined with organic search results to a query, comprising:

utilizing a client device to access a search engine via a network, the search engine interfacing with a relevance model executing on a query system, the query system comprising a specially configured computing resource including a curation engine and the relevance model, the relevance model accessing a target resource for providing responses to queries from the client device over the network;

obtaining, at the relevance model from the client device, user action metrics over a period of time, the user action metrics pertaining to user actions with respect to model responses generated by the relevance model;

determining, by the relevance model using the machine learning model, queries having a ranking above a threshold value;

flagging the queries as automatable;

displaying, at the client device, a list of the flagged queries along with controls for adjusting, using the curation engine, curations of the model responses for the flagged queries, and identifying a portion of the model responses not having statistical significance, wherein the portion continues to be generated using the relevance model and displayed as model results along with the list of flagged queries and determining a defined length for the period of time based on a volume of user actions.

7. The method according to claim 6, further comprising unflagging a portion of the queries having insufficient amounts of user action metrics based on a threshold value.

8. The method according to claim 6, further comprising pinning a portion of the flagged queries on a graphical user interface.

9. The method according to claim 6, further comprising receiving the curations as user-defined responses rather than the model responses that would be provided using the relevance model.

10. The method according to claim 6, further comprising determining a volume of user actions with respect to the model responses or a direction of the user actions across the model responses.

11. A query system comprising:

a processor; and a memory for storing executable instructions, the processor executing the instructions to communicate with a client device to enable a client use of a search engine via a network, the search engine interfacing with a relevance model executing on the query system, the query system comprising a specially configured computing resource including a curation engine and the relevance model, the relevance model accessing a target resource for providing responses to queries from the client device over the network;

obtain, at the relevance model, user action metrics over a period of time corresponding to model responses provided in reply to a query, the model responses being provided based on the relevance model;

determine, by the relevance model, one or more of the user action metrics having statistical significance;

place one or more of the responses to the query into a curated list based on their statistical significance to create curated responses;

provide the curated responses for the query rather than the model responses used to create the curated responses, and determine a defined length for the period of time based on a volume of user actions, wherein the model responses not having statistical significance continue to be generated by the relevance model for display as model results with the curated responses.

12. The system according to claim 11, wherein the curations comprise user-defined responses rather than the model responses that would be provided using the relevance model.

13. The system according to claim 11, wherein the processor is configured to determine a volume of user actions with respect to the model responses or a direction of the user actions across the model responses.

14. The system according to claim 11, wherein the processor is configured to:

periodically evaluate user action metrics corresponding to the curated responses; and rearrange an order of the curated list of the curated responses based on the evaluation.

15. The system according to claim 11, wherein the processor is configured to provide the curated responses regardless of whether underlying content of the curated responses have changed in such a way that the relevance model would have not provided the curated responses in response to the query.

* * * * *